US009852709B2

(12) United States Patent
 Van Raamsdonk

(10) Patent No.: US 9,852,709 B2
(45) Date of Patent: Dec. 26, 2017

(54) GENERATING A MAP DISPLAY IMAGE

(75) Inventor: Ewoud Van Raamsdonk, Utrecht (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 278 days.

(21) Appl. No.: 12/736,744

(22) PCT Filed: May 29, 2008
 (Under 37 CFR 1.47)

(86) PCT No.: PCT/EP2008/004604
 § 371 (c)(1),
 (2), (4) Date: Apr. 15, 2011

(87) PCT Pub. No.: WO2009/143873
 PCT Pub. Date: Dec. 3, 2009

(65) Prior Publication Data
 US 2012/0038623 A1 Feb. 16, 2012

(51) Int. Cl.
 *G09G 5/00* (2006.01)
 *G01C 21/36* (2006.01)
 (Continued)

(52) U.S. Cl.
 CPC ........... *G09G 5/00* (2013.01); *G01C 21/3673* (2013.01); *G09B 29/106* (2013.01);
 (Continued)

(58) Field of Classification Search
 CPC .............. G01C 21/367; G01C 21/3682; G01C 21/3673; G01C 21/3614; G01C 21/3667;
 (Continued)

(56) References Cited

U.S. PATENT DOCUMENTS 4,527,155 A * 7/1985 Yamaki et al. ............... 345/657
4,914,605 A * 4/1990 Loughmiller, Jr. G01C 21/3673
 340/995.1
(Continued)

FOREIGN PATENT DOCUMENTS

CN 1228864 A 9/1999
CN 1647137 A 7/2005
(Continued)

OTHER PUBLICATIONS

International Search Report.
International Preliminary Report on Patentability dated Nov. 30, 2010.

*Primary Examiner* — Haixia Du

(57) ABSTRACT

A method and apparatus are disclosed for generating a display image including a map view and linepiece information for example legible text and/or characters (e.g. alphanumeric) such as road names superposed on the map view. In at least one embodiment, the technique selects linepieces that are easy to read, by (i) selecting from a first subset of alphanumeric linepieces associated with information on the map, a second sub-set of the alphanumeric linepieces satisfying predetermined criteria including display angle; and (ii) including in the display image the second sub-set of alphanumeric linepieces. The first sub-set may be selected according to distance criteria.

17 Claims, 7 Drawing Sheets

(51) Int. Cl.
*G09B 29/10* (2006.01)
*G08G 1/0969* (2006.01)

(52) U.S. Cl.
CPC ..... *G08G 1/0969* (2013.01); *G09G 2320/028* (2013.01); *G09G 2340/12* (2013.01); *G09G 2340/125* (2013.01)

(58) Field of Classification Search
CPC .... G01C 21/26; G01C 21/34; G01C 21/3694; G01C 21/3626; G01C 21/3635; G01C 21/3638; G01C 21/3644; G08G 1/0969; G06T 15/10; G06T 2207/30256; G06T 7/0012; G06T 11/60; G06K 9/00798; G06K 9/3283
USPC ......................................................... 345/419
See application file for complete search history.

(56) References Cited

U.S. PATENT DOCUMENTS

| | | | |
|---|---|---|---|
| 5,297,051 A * | 3/1994 | Arakawa et al. ............. 701/520 |
| 5,559,938 A * | 9/1996 | Van Roekel et al. ......... 345/441 |
| 6,121,972 A * | 9/2000 | Takahashi .......... G01C 21/3635 345/419 |
| 6,539,289 B2 * | 3/2003 | Ogino et al. ....................... 701/1 |
| 6,710,774 B1 * | 3/2004 | Kawasaki et al. ............ 345/419 |
| 6,823,259 B2 * | 11/2004 | Miyazawa ..................... 701/431 |
| 6,897,861 B2 * | 5/2005 | Watanabe et al. ............ 345/419 |
| 7,376,510 B1 * | 5/2008 | Green ............................ 701/436 |
| 7,423,771 B2 * | 9/2008 | Ohata et al. .................. 358/1.15 |
| 7,542,882 B2 * | 6/2009 | Agrawala et al. ................. 703/2 |
| 8,244,454 B2 * | 8/2012 | Tertoolen ...................... 701/532 |
| 8,531,438 B2 * | 9/2013 | Arie et al. ..................... 345/204 |
| 8,555,203 B1 * | 10/2013 | Jin ........................ G09B 29/007 715/835 |
| 2001/0026276 A1 * | 10/2001 | Sakamoto et al. ............. 345/473 |
| 2001/0039474 A1 * | 11/2001 | Hayashi et al. ............... 701/208 |
| 2002/0169547 A1 * | 11/2002 | Harada .............. G01C 21/3682 701/438 |
| 2003/0208316 A1 * | 11/2003 | Endo et al. .................... 701/211 |
| 2004/0169653 A1 * | 9/2004 | Endo et al. .................... 345/427 |
| 2004/0236507 A1 * | 11/2004 | Maruyama et al. .......... 701/208 |
| 2005/0052413 A1 * | 3/2005 | Ueno ............................. 345/158 |
| 2005/0083330 A1 * | 4/2005 | Crawford ............ H04N 1/3872 345/440 |
| 2005/0182560 A1 * | 8/2005 | Cochlovius et al. ......... 701/208 |
| 2005/0187711 A1 * | 8/2005 | Agrawala et al. ............ 701/211 |
| 2005/0243104 A1 * | 11/2005 | Kinghorn ...................... 345/649 |
| 2006/0227349 A1 * | 10/2006 | Yamaguchi et al. ......... 358/1.11 |
| 2007/0229541 A1 * | 10/2007 | Klassen et al. ............... 345/636 |
| 2007/0229545 A1 * | 10/2007 | Bowman et al. ............. 345/647 |
| 2008/0040024 A1 * | 2/2008 | Silva ............................. 701/200 |
| 2008/0228386 A1 * | 9/2008 | Geelen ................ G01C 21/367 701/533 |
| 2008/0306684 A1 * | 12/2008 | Yamazaki ..................... 701/208 |
| 2009/0115592 A1 * | 5/2009 | Miake et al. ................. 340/459 |
| 2009/0121900 A1 * | 5/2009 | Fetzmann .............. G06T 11/60 340/971 |

FOREIGN PATENT DOCUMENTS

| | | |
|---|---|---|
| CN | 1296681 C | 1/2007 |
| EP | 0 953 826 | 11/1999 |
| TW | 200805207 A | 1/2008 |

* cited by examiner

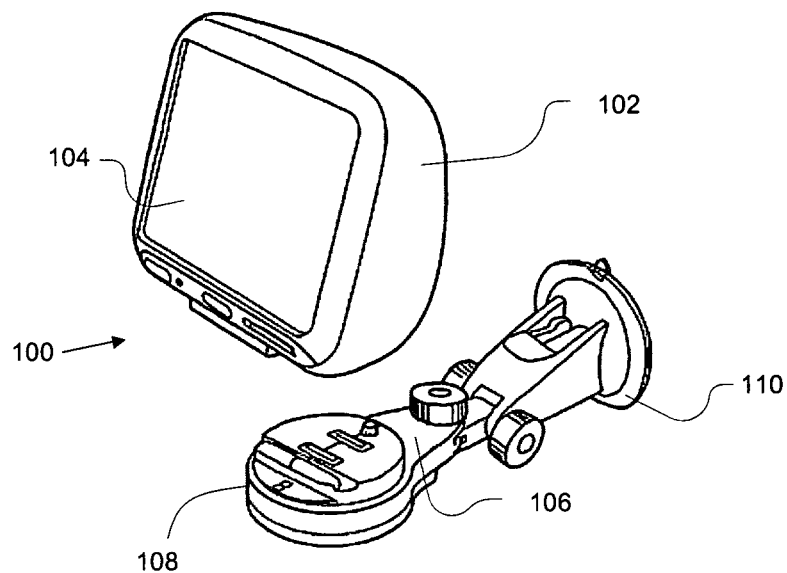
FIG. 6
FIG. 7
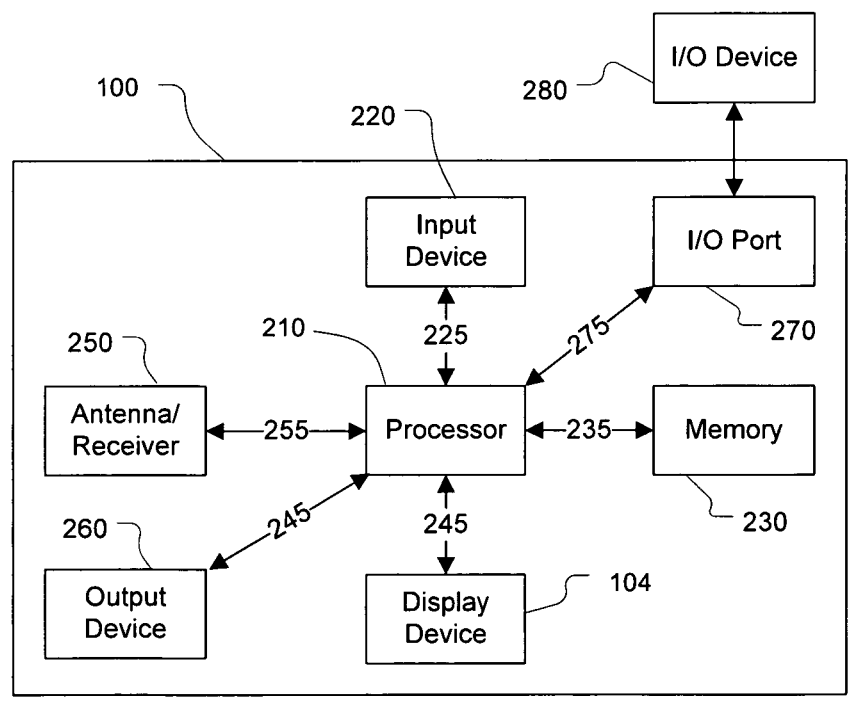

GENERATING A MAP DISPLAY IMAGE

FIELD OF THE INVENTION

This invention relates to an apparatus and method for generating a display image, for example a display image for a navigation device. The invention is especially, although not exclusively, suitable for portable navigation devices (so-called PNDs).

BACKGROUND TO THE INVENTION

Typically, a navigation device (be that an in-vehicle navigation device (i.e. a device built into a vehicle that cannot be removed from that vehicle), a PND such as a TomTom® Go 720, or a mobile telephone, personal digital assistant (PDA) or computer executing navigation software) is configured to display an image consisting of a map view generated from a digital map. The map view may be superposed with route information depicting a navigation route, and whilst the route information may be pre-recorded, but it is typically the result of a route-planning algorithm executed by the navigation device using suitable software. The navigation device may also include a position determining system (such as Global Positioning System (GPS)) for determining the current real-time position of the navigation device, and for dynamically adjusting the map view in accordance with the determined current position.

A popular type of map view is a two-dimensional-based map view that includes information in two-dimensions at ground level. For example, roads and buildings are represented by the shape of their footprints on the ground. Such two-dimensional information may be viewed as a plan (i.e. looking generally vertically downwardly on the map, in the same manner as a traditional paper map), or in artificial perspective as if viewing a traditional flat paper map from a perspective angle. However, in either case, the map view is generally "flat" in the sense that the information is only two-dimensional ground level information. References hereafter to a two-dimensional plan view should be construed to include both of these types of map view.

A further type of map view is a three-dimensional elevated perspective view, similar to an artificial perspective view but including three-dimensional rendering according to height information of map objects. For example, a building is rendered in three-dimensions according to height information for the building.

In the context of in-vehicle use, it is generally desirable to provide a highly intuitive navigation display that (i) provides the driver with current navigation information, and (ii) provides an indication of the future route, so that driver can drive and position the vehicle appropriately.

It has also been previously proposed to provide other information to the driver that could potentially be of use. For example, it has previously been proposed to display points of interest (such as banks, petrol stations or public facilities) that are on or close to the route, street names for roads on or close to the route, and icons representing the location of speed limit enforcement cameras that are on the chosen route.

Whilst the provision of these additional items of information can often be of use to the driver, it is important that the driver is not overburdened with information so that the route becomes difficult to follow, or the map difficult to read, or the driver distracted by the amount of information displayed. This applies to both two-dimensional and three-dimensional map views, but is especially apparent in a three-dimensional perspective elevation, in which the map view contains additional detail in the form of three-dimensional shapes of map objects such as buildings.

Clearly there is a fine balance to be drawn between providing the driver with information that might be of use and not overburdening the display image with information to such an extent that the driver's attention is distracted from safely operating the vehicle in which the PND is provided, and the present invention has been devised with the aim of addressing these contradictory issues.

SUMMARY OF THE INVENTION

To this end, a presently preferred embodiment of the present invention provides a technique for generating a display image from a digital map, the method comprising:
(i) selecting from a first sub-set of linepieces associated with information on the map, a second sub-set of said linepieces satisfying predetermined criteria including display angle;
(ii) including in said display image said second sub-set of linepieces.

This technique may be defined as a method, or an apparatus implementing the technique, or a computer program which implements the technique when executed, or an article of manufacture carrying or embodying the computer program.

As used herein, the term "linepiece" is used to mean legible text or characters, such as road names, place names, region names, object names, that are intended to be readable in the display image.

By selecting linepieces at a display angle that is easy to read, the display image can be substantially decluttered. Preferably, the selection of linepieces is also based on distance. Thus, features and advantages of the invention include (i) the ability to present a map view that is easy and intuitive to read, without distracting a driver's attention, and (ii) avoiding the contradictory issues described above. Other features and advantages of the invention will become apparent from the following description of preferred embodiments. While features believed to be of significance have been identified above and in the appended claims, the Applicant claims protection for any novel feature or idea described herein and/or illustrated in the drawings, whether or not emphasis has been placed thereon.

For example, the apparatus may comprise a navigation device. The apparatus may be portable. The apparatus may be configured for in-vehicle use.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 6 is a schematic perspective view of a navigation apparatus;

FIG. 7 is a schematic block diagram showing the navigation apparatus hardware.

DETAILED DESCRIPTION OF PREFERRED EMBODIMENTS

Preferred embodiments of the present invention are now described with reference to any system for generating a digital map display (for example, a two-dimensional plan view, or an artificial perspective view, or a three-dimensional perspective elevation). Firstly, preferred techniques associated with the invention are described, followed by example apparatus for implementing the invention.

Figure 1:
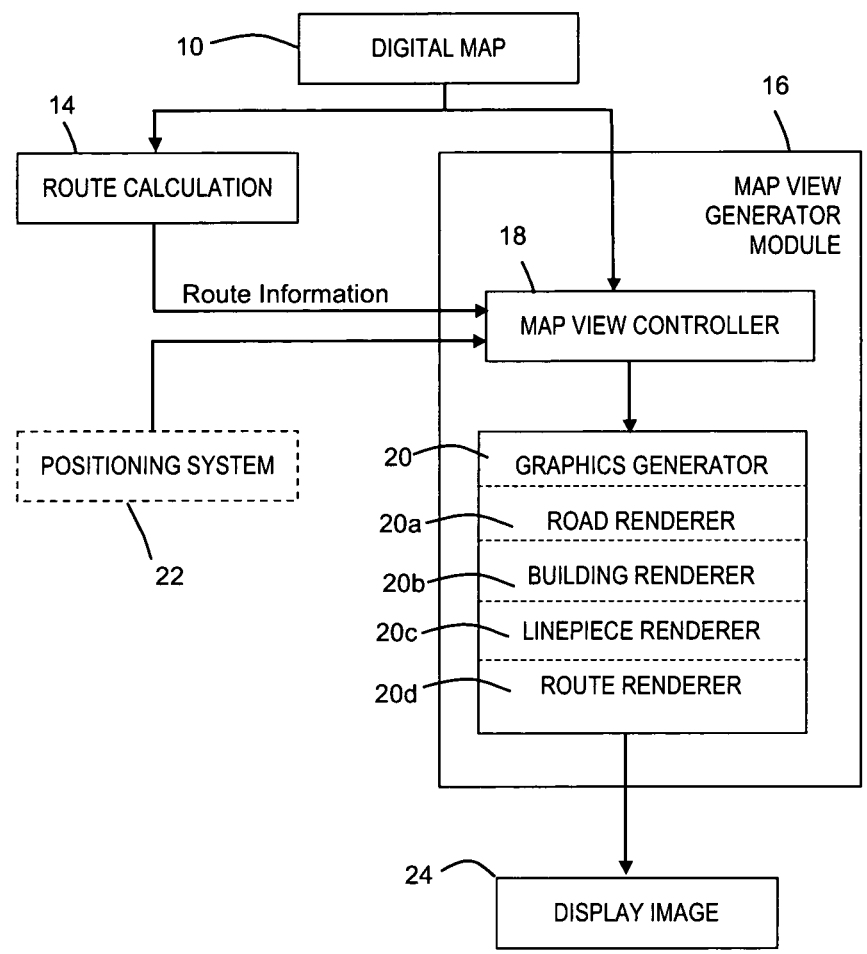
FIG. 1 is a schematic illustration showing information flow for generating a map view in a first embodiment.

FIG. 1 depicts schematically information flow used in a first embodiment, for processing information from a digital map 10, to generate a display image 24 including a map view superposed with linepieces within the map view. The term "linepiece" is intended to mean any legible text and/or characters (e.g. alphanumeric); such as road names, place names, object names, regions names, etc. It will be appreciated that FIG. 1 is not intended to represent a limiting architecture for implementing the invention. Instead, it merely represents an example of information flow between various processing stages. The digital map 10 stores information representing, amongst other things, the positions of roads, and other map objects such as buildings.

Information from the digital map 10 is supplied to a map view generator module 16. The information from the digital map 10 may also be applied to an optional route calculation module 14 if the technique is implemented on a navigation device. The route-calculation module 14 is configured to plan a navigation route between a geographical start position and a geographical end position selected by a user. The user may also provide additional route criteria, such as passing through one or more intermediate locations selectable by the user, or for using certain types of road or other transportation routes. The route-calculation module 14 provides the calculated route information to the map view generation module 16 for superposing the route information in the map view for display.

The map view generation module 16 typically comprises sub-modules including, by way of example, a map view controller 18, and a graphics generator 20 responsive to the controller 18. The map view controller 18 manages a map view, by controlling which information is retrieved from the digital map 10, how the information is to be displayed as the map view, and how the additional information is to be superposed in the map view. For creating a three dimensional perspective elevation view, the controller 18 also manages the elevation height and elevation viewing angle at which the perspective view is to be created, compared to ground level. The map-view controller module 16 also dynamically controls a location "window" on to the digital map (e.g. the portion of the map displayed in the map view). For example, the location window may depend on the current real-time position of a user as may be determined by an optional position determining module 22, for example, a GPS or other satellite/wireless signal based positioning system. Alternatively, the location window may be a location selected by the user. The graphics generator 20 includes one or more graphics engines for generating, or composing, the display image 24, pixel-by-pixel, on the basis of the map view information managed by the controller 18. The graphics engines may include, or execute commands to implement, a road renderer 20*a*, a building renderer 20*b* for rendering building representations in the display image, a linepiece render 20*c* for superposing linepiece information in the display image, and a route information renderer 20*d* for superposing the route information in the map view, as well as other custom graphics commands or engines.

Referring to FIGS. 2-5, a feature of the present embodiment is the implementation of a selection technique for selecting which items of linepiece information to display. The selection is based on (i) distance of the linepiece from a certain position, and/or (ii) the angle of the linepiece information in the display.

Figure 2:
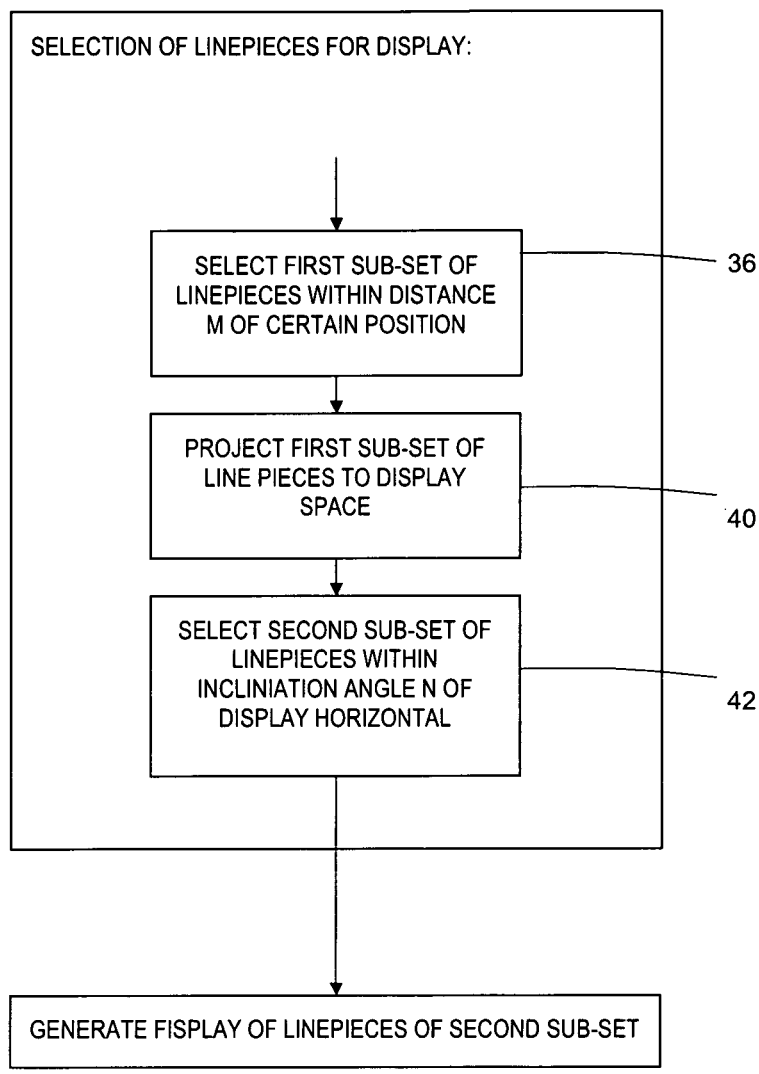
FIG. 2 is a schematic flow diagram showing a first technique for selecting linepieces for display.
Figure 3:
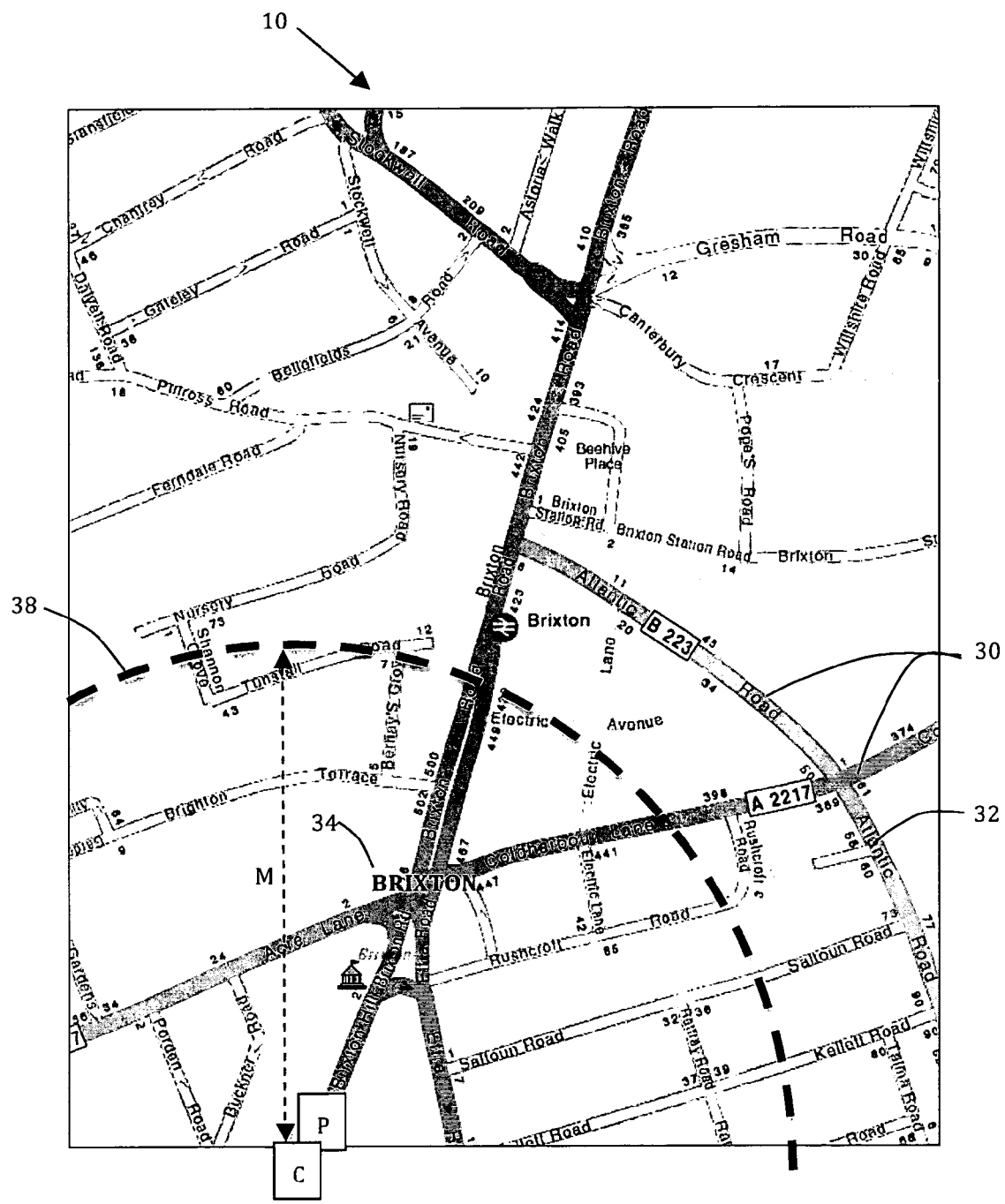
FIG. 3 is a schematic illustration of the information content of a portion of a digital map.

FIG. 3 depicts schematically the content of digital map 10 in the proximity of a viewing position or camera position C for viewing the map, and a current position P (e.g. identified by the position determining module 22 if implemented). In FIG. 3, the information in the digital map 10 is depicted schematically in the form of a two-dimensional plan view, but it will be appreciated that this is merely to aid understanding of the present invention. The contents of the digital map 10 will usually be encoded and represented in a digital manner that might not resemble such a two-dimensional view. The digital map includes the positions of roads 30, and associated linepiece information, including road names 32 and place names 34. In the digital map 10, the linepieces may already be organised with equal priority, or the linepieces may already be organised hierarchically (for example, region names in an upper priority level, followed by place names in a lower priority level, and followed by road names and object names in one or more even lower priority levels). In the case of equal priority, the selection technique of FIG. 2 may be applied to all linepieces. In the case of a hierarchical priority, the selection technique of FIG. 2 may be applied to a selected one or more levels of priority, such as those containing road names.

At step 36 (FIG. 2), a first sub-set 38 (FIG. 3) of the linepieces is selected that are not more distant than a certain distance M from a certain position, such as the camera position C or the current position P. The distance M may, for example, be a range of up to 500 meters, or preferably 250 meters. This distance M may be predetermined as a fixed value, or it may be variable value. Such a variable value could depend on, for example, the display scale and/or display resolution and/or the camera viewing height above the digital map. Step 36 may conveniently be implemented by ordering the linepieces in order of increasing distance from the point, and then selecting only those linepieces matching the distance criterion.

Figure 4:
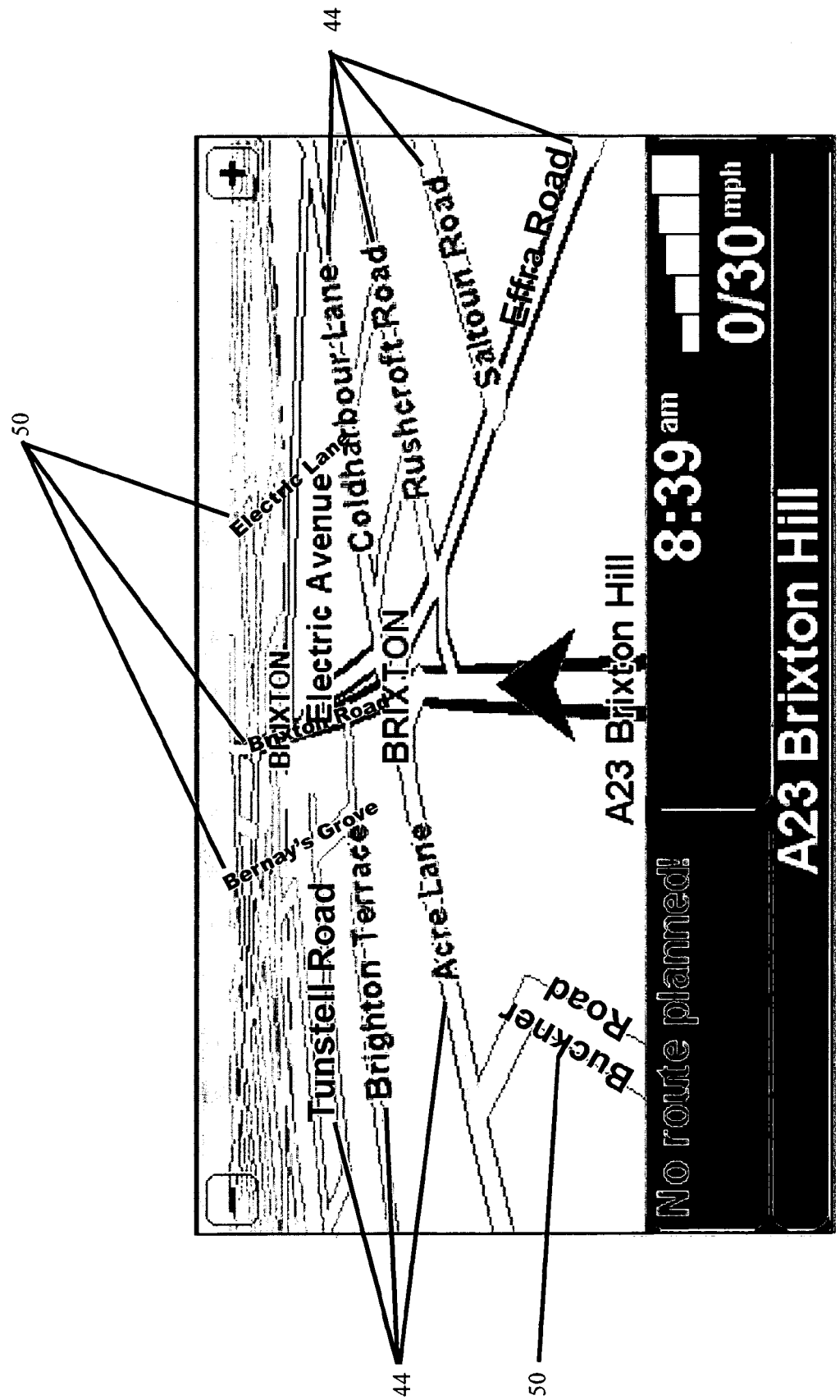
FIG. 4 is a schematic illustration of a projection of linepieces into display space to assess display angle.

At step 40 (FIG. 2), a calculation is made that projects, or simulates a projection of, each linepiece to its respective position in the display image. This step is to enable an assessment of the display angle of each linepiece. FIG. 4 depicts the display image in the form of a three-dimensional perspective view, and including the first sub-set 38 of linepieces. As can be seen in FIG. 4, place names 34 are generally arranged horizontally, and each road name 32 is aligned or orientated in the same direction as the associated road 30, to facilitate road identification. The angle of orientation of the road 30, and the road name 32 depends on (i) the relative road angle in the digital map 10 modified according to (ii) the three-dimensional perspective in the display image. The three-dimensional perspective may depend on the camera viewing position height, and the distance from the viewing position.

At step 42 (FIG. 2), a further calculation is made as to whether the magnitude of the angle of orientation of each linepiece, with respect to a horizontal direction in the display image, exceeds a certain threshold "N". A second sub-set 44

Figure 5:
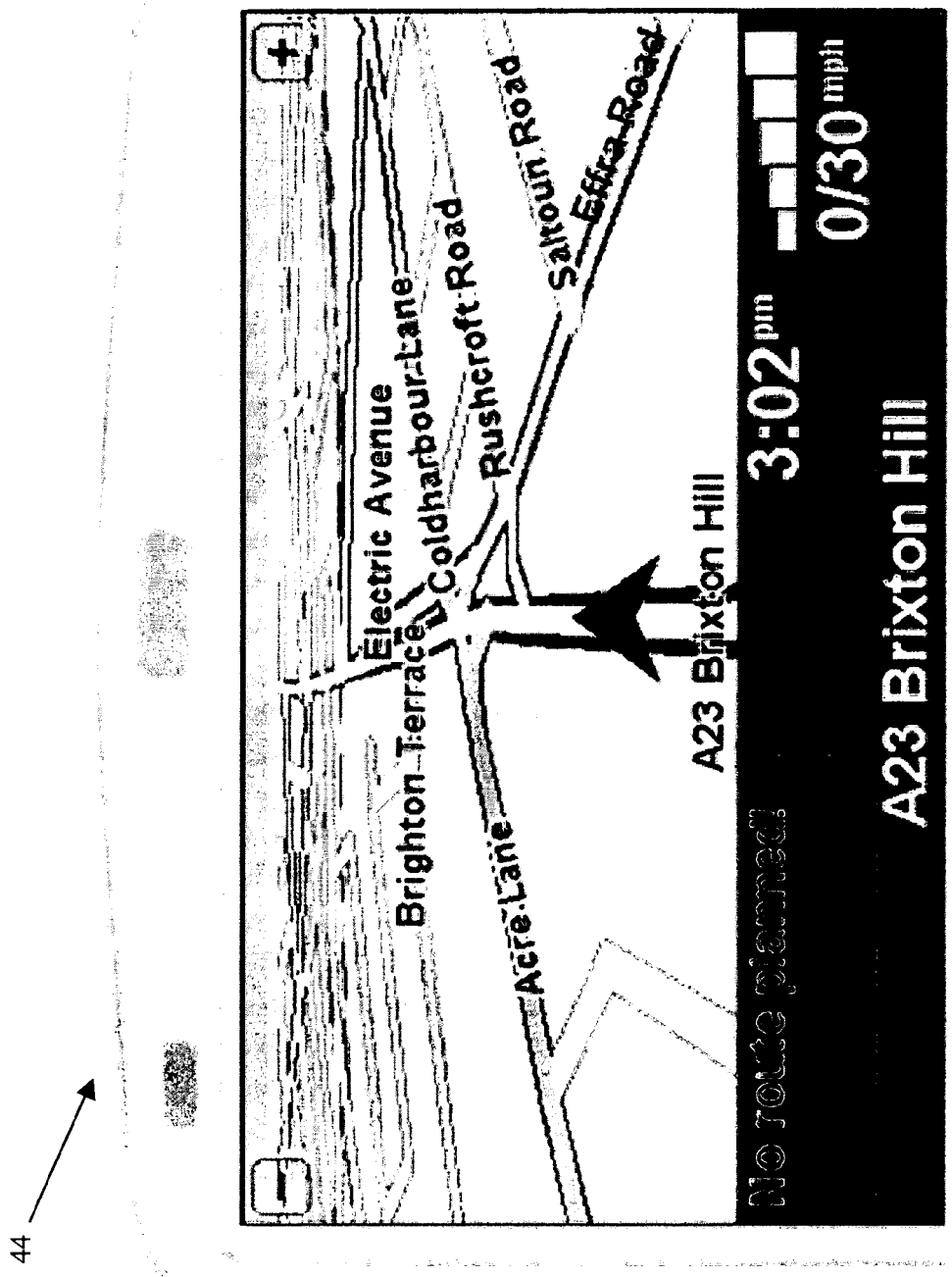
FIG. 5 is a schematic screenshot of a map view generated using linepiece selection technique.

(FIGS. 4 and 5) of the linepieces from the first sub-set 38, is selected as those linepieces not exceeding the threshold, for display in the final image (FIG. 5). The value of N is selected to prevent linepieces being displayed at an angle that is awkward to read, especially while driving. Excluding such awkward linepieces can greatly declutter the information content in the display image, and enable the display to be read intuitively and rapidly. For example, N may be at least 10°, and/or not more than 30°. In one form, N is about 20°.

For example, in FIG. 4, the linepieces "Acre Lane", "Coldharbour Lane", "Rushcroft Road", "Saltoun Road" and "Effra Road" are each inclined with respect to the horizontal, but at respectively small magnitude angles that are less than N=20°. These linepieces are relatively easy and quick to read, and are retained in the second sub-set 44 that is displayed in the final image (FIG. 5). However, the linepieces 50 including "Buckner Road", "Barney's grove", "Brixton Road" and "Electric Lane" are inclined at larger magnitude angles that exceed N=20°. These linepieces 50 are judged as being awkward to read, and are excluded from the second sub-set 44, and thus not displayed in the display image (FIG. 5).

It will be appreciated that the present embodiment can exclude awkward linepieces from the display image. Excluding such awkward linepieces can greatly declutter the information content in the display image, and enable the display to be read intuitively and rapidly. This is especially important for in-vehicle use, and avoids the driver being distracted by a linepieces that are difficult to read.

In the above embodiment, the selection based on linepiece angle is performed after a first selection based on distance. This is because the distance calculation may be more efficient to implement, and so this order may reduce computation overhead. However, it will be appreciated that the order of the sub-selections may be reversed if desired. Alternatively, either one of the sub-selections (i.e. selectively distance or angle) may optionally be excluded if desired, leaving only selection based on the other. In a further form, selection may be influenced by a further parameter such as whether the device is determined to be stationary (or moving only slowly), or whether the device is substantially moving (e.g. at vehicle speed). In the former case, the driver may be able to devote more attention to the display image of the map, and appreciate a greater amount of linepiece information (even linepieces that are orientated awkwardly to read). In the latter case, the driver may prefer a decluttered display image of the map, that is easier and quicker to read while on the move, without distracting the driver from driving. Thus the invention also contemplates adapting the selection of linepieces in dependence on a further parameter.

The technique of FIG. 2 is typically performed by the map view controller 18 (FIG. 1), and can assess sub-sets (e.g. the first and second sub-sets 38 and 44) before the linepieces are rendered by the graphics generator 20. Once assessed, the second sub-set 44 of linepieces is passed to the graphics generator 20 to include in the display image.

Figure 8:
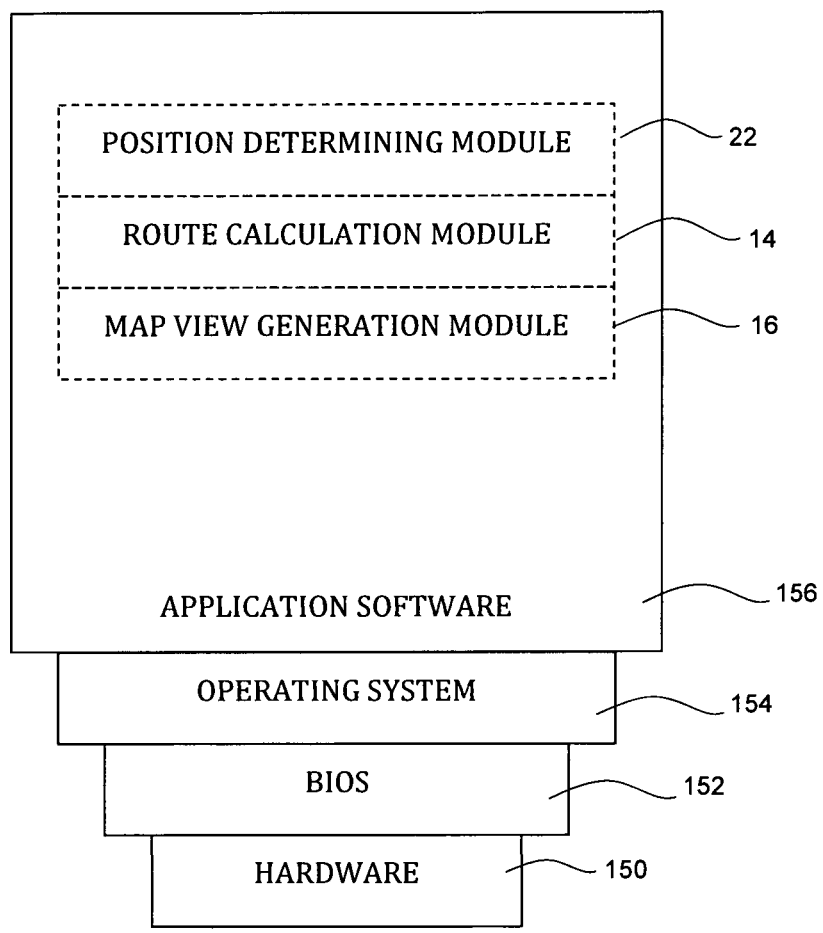
FIG. 8 is a schematic diagram showing a functional operative relation established by the hardware and software.

Having described the preferred functional techniques, FIGS. 6-8 now illustrate a physical apparatus or system for implementing one or more of these techniques. The system may comprise an autonomous device, such as a portable navigation device (PND), an in-vehicle navigation device, a portable map viewer, a device including a positioning system (for example, a satellite based positioning system such as a Global Positioning System (GPS)), a portable digital assistant (PDA), a portable computer, or non-portable computer. Alternatively, the system may comprise a server storing the digital map, and a remote terminal or computer configured to generate a display of the digital map based on information received from the server over one or more networks, such as an internet or intranet.

FIG. 6 depicts an example embodiment in the form of a PND 100. A PND is chosen as this represents the most challenging design in which design constraints such as confined display size, limited processing power and speed, as well as weight and power supply limitations, are most acute. The PND 100 generally comprises a housing 102 accommodating the PND's electronic hardware, including a display screen 104. The PND is made suitable for in-vehicle use by means of a dock bracket 106. The dock bracket 106 includes a coupling part 108 for releasable or separable docking engagement with a complementary coupling part on the housing 102. The bracket 106 further includes a mounting element 110, such as a suction cup or an adhesive pad, for attaching the bracket 106 to a suitable surface of the vehicle (not shown).

FIG. 7 is an illustrative representation of electronic components 152 of the navigation device 100, in block component format. It should be noted that the block diagram of the navigation device 100 is not inclusive of all components, but is only representative of many example components.

The navigation device 100 includes a processor 210 connected to an input device 220 and the display screen 104. The input device 220 can include a keyboard device, voice input device, touch panel and/or any other known input device utilised to input information; and the display screen 104 can include any type of display screen such as an LCD display, for example. In a particularly preferred arrangement the input device 220 and display screen 104 are integrated into an integrated input and display device, including a touchpad or touchscreen input so that a user need only touch a portion of the display screen 104 to select one of a plurality of display choices or to activate one of a plurality of virtual buttons.

The navigation device may include an output device 260, for example an audible output device (e.g. a loudspeaker). As output device 260 can produce audible information for a user of the navigation device 100, it is should equally be understood that input device 220 can include a microphone and software for receiving input voice commands as well.

In the navigation device 100, processor 210 is operatively connected to and set to receive input information from input device 220 via a connection 225, and operatively connected to at least one of display screen 104 and output device 260, via output connections 245, to output information thereto. Further, the processor 210 is operatively connected to memory 230 via connection 235. The memory 230 can include any suitable article of manufacture or media, including non-volatile memory and/or volatile memory, writable and/or read-only memory, semiconductor memory (such as RAM and/or FLASH), magnetic memory, such as a magnetic disc, and optical memory, such as an optical disc. The memory 230 stores various information including executable software, and the digital map 10 discussed above.

The processor 210 is further configured to receive/send information from/to input/output (I/O) ports 270 via connection 275, wherein the I/O port 270 is connectable to an I/O device 280 external to the navigation device 100. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 100 and the internet or any other network for example, and/or to establish a connection to a server via the internet or some other network for example.

FIG. 7 further illustrates an operative connection between the processor 210 and an antenna/receiver 250 via connection 255, wherein the antenna/receiver 250 can be configured for receiving positioning system signals (such as GPS signals or other radio or satellite signals) from which the current real-time position of the navigation device 100 can be determined in a known manner. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 9 are powered by power sources (not shown) in a conventional manner. As will be understood by one of ordinary skill in the art, different configurations of the components shown in FIG. 9 are considered to be within the scope of the present application. For example, the components shown in FIG. 9 may be in communication with one another via wired and/or wireless connections and the like. Also, although the connections are shown as independent of each other, some or all of the connections may share one or more communication buses.

Referring to FIG. 8, the processor 210 and memory 230 cooperate to establish a BIOS (Basic Input/Output System) 150 that functions as an interface between the functional hardware components 152 of the navigation device 100 and the software executed by the device. The processor 210 then loads from memory 230 an operating system 154 which provides an environment in which application software 156 can run.

Depending on the functionality provided by the navigation device 100, the application software 156 may include one or more of: the position determining module 22; the route-calculation module 14; and the map view generation module 16 implementing a three-dimensional perspective elevation in which the display of linepieces is controlled in dependence on distance from a certain position and/or display angle.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of generating a display image, the method comprising:
   selecting from a first sub-set of linepieces, a second sub-set of linepieces according to display criteria including display angle of the linepieces in the first sub-set, a linepiece being a legible text or characters; the step of selecting comprising:
   projecting linepieces of the first sub-set into a display space;
   determining the display angle of each linepiece projected in the display space, the display angle of each linepiece being an angle of inclination of the linepiece with respect to a horizontal direction in the display space;
   selecting for the second sub-set each linepiece whose display angle lies in a selection range, wherein each linepiece in the first subset is associated with a priority based on a type of the linepiece, and wherein the selection of second sub-set of linepieces is made from among only linepieces that are of or less than a specified priority; and
   including in the display image the second sub-set of linepieces whose display angle lies in the selection range or whose priority is greater than the specified priority, and excluding from the display image linepieces whose display angle is out of the selection range and whose priority is of or less than the specified priority;
   wherein the display image includes a map view and linepiece information superposed on the map view.

2. The method of claim 1, wherein the selection range is defined by at least one threshold magnitude of angle with respect to said horizontal direction.

3. The method of claim 2, wherein the threshold magnitude of angle is between 10° and 30°.

4. The method of claim 3, wherein the threshold magnitude of angle is 20°.

5. The method of claim 1, wherein the linepieces comprise road names for roads in the digital map.

6. The method of claim 5, wherein the road name is aligned with a representation of the road in display space.

7. The method of claim 1, wherein the map view is a three-dimensional perspective elevation.

8. The method according to claim 1, wherein the selection of second sub-set of linepieces is made from all the linepieces available in a digital map, if the linepieces in the digital map are organised with equal priority.

9. The method according to claim 1, further comprising: selecting the first sub-set of linepieces based on a distance from a specified position for the map view.

10. The method of claim 9, wherein the specified position is one of: a viewing position from which the map view is generated, and a current position represented within the map view.

11. The method of claim 9, wherein the distance is not more than 250 meters.

12. The method according to claim 9, further comprising: determining the distance based on one or more of: a display scale of the map view, a display resolution, and a viewing position above the map view.

13. The method according to claim 9, wherein selecting a first sub-set of linepieces based on the distance from the specified position for the map view comprises:
   ordering linepieces in order of increasing distance from the specified position for the map view; and
   using the ordering to select, for inclusion in the first sub-set, linepieces that are within the distance from the specified position for the map view and excluding other linepieces from the first sub-set.

14. The method of claim 1, further comprising: Generating the selection range for the display angle of the linepieces based on a detected movement, the selection range being larger when a detected movement is slower and smaller when a detected movement is faster.

15. A non-transitory computer-readable medium carrying or embodying a computer program which, when executed, causes a processor to perform a method comprising:
selecting from a first sub-set of linepieces, a second sub-set of linepieces according to display criteria including display angle of the linepieces in the first sub-set, a linepiece being a legible text or characters; the step of selecting comprising:
projecting linepieces of the first sub-set into a display space;
determining the display angle of each linepiece projected in the display space, the display angle of each linepiece being an angle of inclination of the linepiece with respect to a horizontal direction in the display space;
selecting for the second sub-set each linepiece whose display angle lies in a selection range, wherein each linepiece in the first subset is associated with a priority based on a type of the linepiece, and wherein the selection of second sub-set of linepieces is made from among only linepieces that are of or less than a specified priority; and
including in the display image the second sub-set of linepieces whose display angle lies in the selection range or whose priority is greater than the specified priority, and excluding from the display image linepieces whose display angle is out of the selection range and whose priority is of or less than the specified priority;
wherein the display image includes a map view and linepiece information superposed on the map view.

16. An apparatus for generating a display image including a map view and linepiece information superposed on the map view, a linepiece being a legible text or characters, the apparatus comprising:
a device for selecting from a first sub-set of linepieces, a second sub-set of linepieces according to display criteria including display angle of the linepieces in the first sub-set;
a device for projecting linepieces of the first sub-set into a display space; determining the display angle of each linepiece projected in the display space, the display angle of each linepiece being an angle of inclination of the linepiece with respect to a horizontal direction in the display space; and selecting for the second sub-set each linepiece whose display angle lies in a selection range, wherein each linepiece in the first subset is associated with a priority based on a type of the linepiece, and wherein the selection of second sub-set of linepieces is made from among only linepieces that are of or less than a specified priority; and
a device for including in the display image the second sub-set of linepieces whose display angle lies in the selection range or whose priority is greater than the specified priority, and excluding from the display image linepieces whose display angle is out of the selection range and whose priority is of or less than the specified priority.

17. The apparatus according to claim 16, wherein the device for selecting the second sub-set of linepieces is arranged to select the second sub-set of linepieces based on whether the apparatus is stationary or moving.

* * * * *